(12) United States Patent
Pischel et al.

(10) Patent No.: US 12,711,964 B2
(45) Date of Patent: Aug. 18, 2026

(54) HEARING DEVICE AND METHOD OF OPERATING A HEARING DEVICE

(71) Applicant: Sivantos Pte. Ltd., Singapore (SG)

(72) Inventors: Judith Pischel, Erlangen (DE); Claudia Pischel, Erlangen (DE); Alexander Briegleb-Schmidt, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 19/216,163

(22) Filed: May 22, 2025

(65) Prior Publication Data

US 2025/0372102 A1 Dec. 4, 2025

(30) Foreign Application Priority Data

May 31, 2024 (DE) ..................... 10 2024 205 064.4

(51) Int. Cl.
*G10L 17/26* (2013.01)

(52) U.S. Cl.
CPC .................................... *G10L 17/26* (2013.01)

(58) Field of Classification Search
CPC ....................................................... G10L 17/26
USPC .......................................................... 704/200
See application file for complete search history.

(56) References Cited

U.S. PATENT DOCUMENTS 4,049,930 A * 9/1977 Fletcher ........... G01R 19/16542 381/60
5,201,006 A * 4/1993 Weinrich ............. H04R 25/453 381/328
6,236,966 B1 * 5/2001 Fleming .................. G10L 13/08 704/E13.011

(Continued)

FOREIGN PATENT DOCUMENTS

DE 102009043775 A1 4/2011
DE 102013224417 B3 5/2015

(Continued)

OTHER PUBLICATIONS

Lee, Chi-Chun, et al., Deep representation learning for affective speech signal analysis and processing. In: IEEE signal processing magazine, vol. 38, 2021, No. 6, S. 22-38. ISSN, 1053-5888.

(Continued)

*Primary Examiner* — Thuykhanh Le
(74) *Attorney, Agent, or Firm* — Laurence A. Greenberg; Werner H. Stemer; Ralph E. Locher

(57) ABSTRACT

A hearing device includes a receiving unit for receiving speech information and transforming it into a speech signal, a signal processing unit for signal-processing of the speech signal and generating an output signal, and an output unit for outputting an output signal to a hearing device user. A method of operating the hearing device includes transforming speech information into a speech signal. The speech signal is processed into an output signal by the signal processing unit for output to the hearing device user. At least one emotion-correlated feature is determined from each of the speech signal and the output signal. The emotion-correlated features determined from the speech signal and the output signal are compared to one another. A comparison result is determined, and the signal processing unit is set as a function of the comparison result. A hearing device is also provided.

8 Claims, 1 Drawing Sheet

(56) References Cited

U.S. PATENT DOCUMENTS 6,327,366 B1 * 12/2001 Uvacek .................. H04R 25/70 381/60
6,430,443 B1 * 8/2002 Karell ................ A61N 1/36036 607/57
6,785,394 B1 * 8/2004 Olsen ................... H04R 25/505 381/323
7,922,671 B2 * 4/2011 Zoth ...................... A61B 5/126 600/544
9,936,308 B2 4/2018 Harczos
10,157,629 B2 * 12/2018 Van Der Made ....... G10L 25/78
11,790,926 B2 * 10/2023 Lee ......................... G10L 25/30 704/500
2004/0057593 A1 * 3/2004 Pedersen .............. H04R 29/006 381/312
2004/0071304 A1 * 4/2004 Yanz ...................... H04R 25/70 381/60
2004/0175012 A1 * 9/2004 Roeck .................. H04R 25/505 381/317
2004/0209654 A1 * 10/2004 Cheung ................... H04M 1/03 455/575.1
2006/0008101 A1 * 1/2006 Kates ..................... H03G 7/007 381/312
2006/0029245 A1 * 2/2006 Westergaard .......... H04R 25/70 381/314
2006/0098831 A1 * 5/2006 Kaiser .................... H04R 25/70 381/60
2006/0149530 A1 * 7/2006 Hemmert ................. H03H 7/12 704/200
2009/0103742 A1 * 4/2009 Ribic ..................... H04R 25/35 381/60
2010/0046765 A1 * 2/2010 De Bruijn .............. H03G 3/001 381/104
2011/0142273 A1 * 6/2011 Iwano .................... H04R 25/70 381/321
2011/0150256 A1 * 6/2011 Baechler .............. H04R 25/353 381/316
2012/0099748 A1 * 4/2012 Probst .................. H04R 25/652 381/322
2012/0288107 A1 * 11/2012 Lamm .................... H04R 25/30 381/59
2012/0300964 A1 * 11/2012 Ku ......................... A61B 5/125 381/321
2013/0003981 A1 * 1/2013 Lane .................... H04R 29/001 381/58
2013/0046546 A1 * 2/2013 Uhle ................... G10L 21/0364 704/500
2013/0218559 A1 * 8/2013 Yamabe .............. G10L 21/0216 704/226
2016/0098993 A1 * 4/2016 Yamamoto ............ G10L 15/075 704/234
2016/0119723 A1 * 4/2016 Galster ................ H04R 25/407 381/315
2016/0261959 A1 * 9/2016 Harczos ............... H04R 25/353
2016/0334531 A1 * 11/2016 Elkington .............. G01V 1/303
2017/0054848 A1 * 2/2017 Meng .................. H04M 3/5233
2017/0180876 A1 * 6/2017 Theill .................. H04B 17/345
2017/0311091 A1 * 10/2017 Nakagawa ........... H04R 25/505
2017/0311096 A1 * 10/2017 Rosenkranz .......... G10L 19/008
2019/0132688 A1 * 5/2019 Boldt ..................... H04R 25/43
2019/0265121 A1 * 8/2019 Grutta ..................... G01L 23/32
2020/0120431 A1 * 4/2020 Hannemann ......... H04R 25/505
2020/0162825 A1 * 5/2020 El Guindi ........... G10L 21/0208
2021/0037326 A1 * 2/2021 Pihl ...................... H04R 29/001
2021/0044896 A1 * 2/2021 Kim ........................ H03F 3/183
2021/0046276 A1 * 2/2021 Papania ................. A61B 5/375
2021/0058714 A1 * 2/2021 Crameri ............... H04R 25/356
2021/0058715 A1 * 2/2021 Hildebrand .......... H04R 25/353
2021/0306771 A1 9/2021 El Guindi
2021/0329378 A1 * 10/2021 Zhang .................... H04R 9/025
2021/0400400 A1 * 12/2021 Gomez ................ H04R 25/407
2022/0233104 A1 * 7/2022 Rehmann ............... H04R 25/70
2022/0262225 A1 * 8/2022 Sato ..................... G06V 40/172
2022/0272465 A1 8/2022 Boldt
2022/0295192 A1 * 9/2022 Boldt ................... H04R 25/558
2023/0016667 A1 1/2023 Srour et al.
2023/0122900 A1 * 4/2023 Lee ....................... G10L 15/187 704/235
2023/0129442 A1 * 4/2023 Lim ........................ G10L 25/78 704/200
2023/0232169 A1 * 7/2023 Casper ................. H04R 25/507 381/314
2023/0232170 A1 * 7/2023 Casper ................. H04R 25/407 381/317
2023/0232171 A1 * 7/2023 Casper ................. H04R 25/554
2023/0232172 A1 * 7/2023 Casper ................. H04R 25/507 381/317
2024/0087597 A1 * 3/2024 Byun ...................... G10L 25/63
2024/0203574 A1 * 6/2024 Dyssegard ............ H04R 25/70
2024/0414485 A1 * 12/2024 Gomez .................. H04R 25/50
2025/0224916 A1 * 7/2025 Lee ........................ H04R 3/005
2025/0232761 A1 * 7/2025 Daido ...................... G10H 7/12

FOREIGN PATENT DOCUMENTS

EP 3618456 A1 3/2020
EP 3879853 A1 9/2021

OTHER PUBLICATIONS

Schuller, B.W., “Speech emotion recognition: two decades in a nutshell, benchmarks and ongoing trends”, Communications of the ACM, vol. 61, Issue 5, pp. 90-99.

* cited by examiner

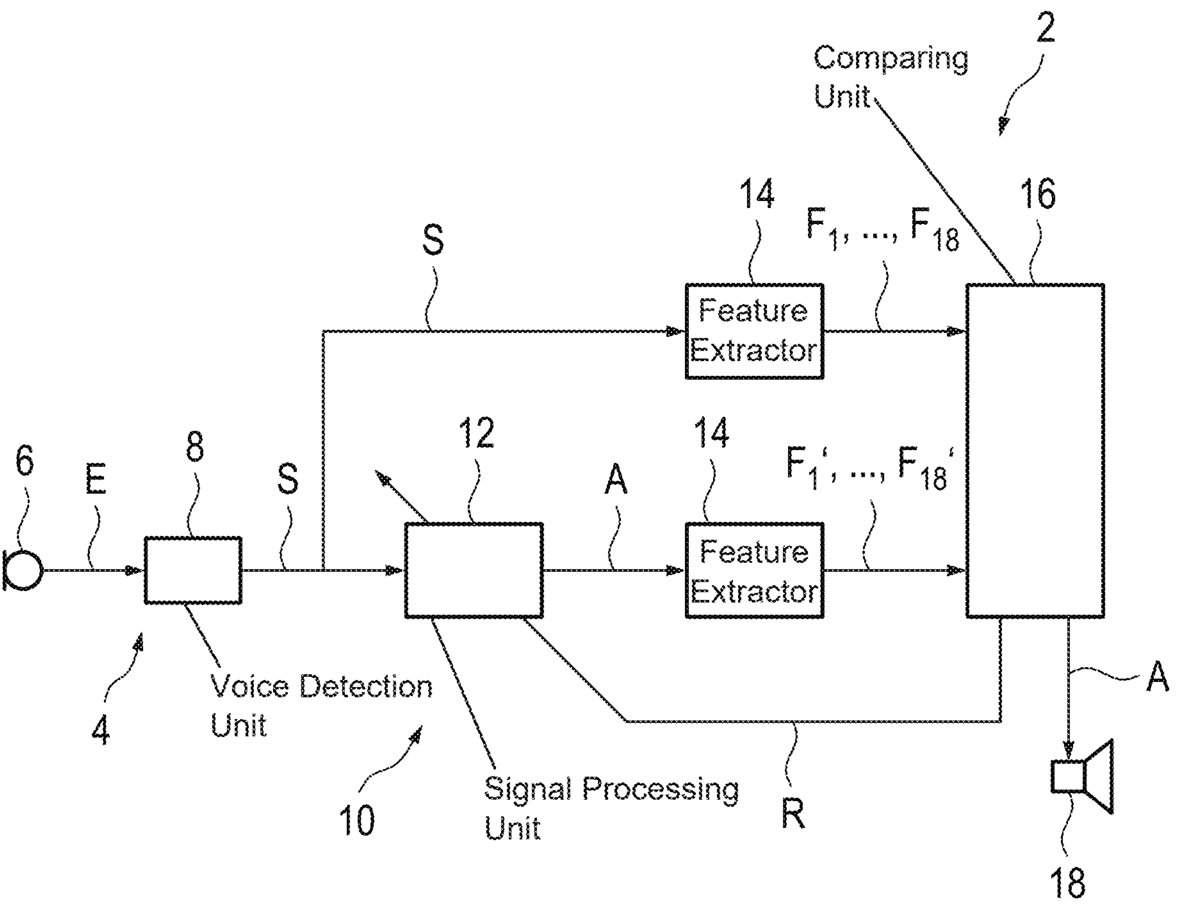
Comparing Unit
2
14
F1, ..., F18
16
S
Feature Extractor
12
14
F1', ..., F18'
6
E
8
S
A
Feature Extractor
A
4
Voice Detection Unit
10
Signal Processing Unit
R
18

HEARING DEVICE AND METHOD OF OPERATING A HEARING DEVICE

CROSS-REFERENCE TO RELATED APPLICATION

This application claims the priority, under 35 U.S.C. § 119, of German Patent Application DE 10 2024 205 064.4, filed May 31, 2024; the prior application is herewith incorporated by reference in its entirety.

FIELD AND BACKGROUND OF THE INVENTION

The invention relates to a method of operating a hearing device. The invention also relates to a hearing device for carrying out the method.

A hearing device generally refers to an electronic device which supports the hearing ability of a person wearing the hearing device. In particular, the invention relates to a hearing device configured to fully or partially compensate hearing loss in a hearing-impaired user. Such a device is also known as a "hearing aid" (HA). In addition, there are hearing devices which protect or improve the hearing ability of normal-hearing users, for example intended to enable improved speech comprehension in complex hearing situations. Such devices are also referred to as "Personal Sound Amplification Products" (short: PSAP). Finally, the term "hearing device," as used herein, also encompasses headphones or earbuds (wired or wireless as well as with or without active noise cancellation), headsets, etc., and implantable hearing devices, such as cochlear implants. A hearing device may also be part of an AR system (AR: augmented reality) or a VR system (VR: virtual reality) for outputting acoustic information from a virtual sound source to the user.

Hearing devices in general, and hearing aids in particular, are usually adapted to be worn on the head and in particular in or on an ear of the user, in particular as behind-the-ear (BTE) or in-the-ear (ITE) devices. In view of their internal structure, hearing devices frequently have at least one output transducer which transforms an output audio signal supplied for output purposes into a signal perceivable as sound by a user and outputs it to a user.

In most cases, the output transducer is configured as an electro-acoustic transducer which transforms the (electrical) output audio signal into airborne sound, with this output airborne sound being output into the ear canal of the user. With a behind-the-ear hearing device, the output transducer, which is also referred to as a "receiver," is usually integrated into a housing of the hearing device outside of the ear. In this case, the sound output by the output transducer is conducted into the ear canal of the user by using a sound tube. Alternatively, the output transducer may also be disposed inside the ear canal and thus outside of the behind-the-ear device. Such hearing devices are also referred to as "receiver-in-canal" (RIC) devices. In-the-ear hearing devices, which are of such small dimensions that they do not protrude outside beyond the ear canal, are also referred to as "completely-in-canal" (CIC) devices.

In further configurations, the output transducer may also be configured as an electro-mechanical transducer which transforms the output audio signal into structure-borne sound (vibrations), this structure-borne sound being introduced into the cranial bone of the user. Further, there are implantable hearing devices, in particular cochlear implants, and hearing devices the output transducer of which stimulates the user's auditory nerve directly.

In addition to the output transducer, a hearing device often has at least one (acousto-electrical) input transducer. When the hearing device is in operation, the or each input transducer receives airborne sound from the environment of the hearing device and transforms this airborne sound into an input audio signal (i.e., an electrical signal carrying information on the ambient sound). This input audio signal—also referred to as a "received sound signal"—is frequently output to the user themselves in its original or in a processed form, e.g., for realizing a so-called transparency mode for headphones, for active noise cancellation or to achieve improved sound perception in the user—e.g., with a hearing aid.

Additionally, a hearing device often has a signal processing unit (signal processor). In the signal processing unit, the or each input audio signal is processed (i.e., modified with regard to its sound information). As such, the signal processing unit outputs a correspondingly processed audio signal (also referred to as an "output audio signal" or "modified sound signal") to the output transducer and/or to an external device.

Hearing devices offer various additional (hearing/hearing device) functions, for example in the area of signal processing, which may improve a hearing benefit for a hearing device user (or hearing aid wearer, HAW). Examples of such functions may include: Own Voice Detection (OVD), voice detection or Voice Activity Detection (VAD), Active Noise Reduction (ANR), Active Occlusion Reduction (AOR); streaming of audio information (e.g., music), detection of different body signals (e.g., fitness); detection of certain events and responses thereto (e.g., fall detection—if a user falls, an alarm is sent), etc. In this case, such functions are often embodied in software or processing algorithms of the signal processing unit.

In the application of hearing systems or hearing devices, handling conversational situations constitutes one of the key issues. One reason being that, in a personal conversation, the user of a hearing system is often conveyed important information. In this respect, one important piece of information are also the conversation partner's emotions.

As known from Schuller BW, "Speech emotion recognition: two decades in a nutshell, benchmarks and ongoing trends," Communications of the ACM, Volume 61, Issue 5, pp 90-99, for example, emotions of the speaker are detected in speech signals and classified. As an example, there are several relevant acoustic features which can be extracted from the speech signal. Furthermore, textual contents or emotional keywords may also be used to support the acoustic (emotion) analysis.

In order to understand the patterns of the vocal expression of various emotions and other affective dispositions and processes, it is possible to extract acoustic parameters from the speech signal. This is based on the theoretical assumption that affective processes alter the autonomic arousal and the tone of the striated muscles in different ways, thus influencing the voice and speech production on the phonatory and articulatory levels, so that these alterations may be estimated based on various parameters of the acoustic waveform.

When the hearing device is in operation, a plurality of algorithms operate to accomplish signal processing to compensate the hearing loss but also to provide additional supporting algorithms for the best speech comprehension and/or comfortable hearing. All of those manipulations of the original input signal may influence the acoustic features which are important for emotion detection. Thus, the compensation of a hearing loss by a hearing device may be accompanied by a deterioration of the emotion detection. As a result, the hearing device wearer may not have all signal information in a conversional situation which they need for emotion detection.

SUMMARY OF THE INVENTION

It is accordingly an object of the invention to provide a method of operating a hearing device and a particularly suitable hearing device for carrying out the method, which overcome the hereinafore-mentioned disadvantages of the heretofore-known methods and devices of this general type and with which, in particular, improved speech comprehensiveness is to be provided in conversational situations in terms of emotion detection.

With the foregoing and other objects in view there is provided, in accordance with the invention, a method of operating a hearing device, having a receiving unit for receiving speech information and transforming into a speech signal, a signal processing unit for signal processing of the speech signal and generating an output signal, and an output unit for outputting an output signal to a hearing device user, wherein speech information is transformed into a speech signal, the speech signal is processed into an output signal by the signal processing unit for output to the hearing device user, from each of the speech signal and the output signal, at least one emotion-correlated feature is determined, the emotion-correlated features determined from the speech signal and the output signal are compared to one another, and a comparison result is determined, and the signal processing unit is set as a function of the comparison result.

With the objects of the invention in view, there is concomitantly provided a hearing device, having a receiving unit for receiving speech information and transforming into a speech signal, a signal processing unit for signally processing the speech signal and generating an output signal, and an output unit for outputting an output signal to a hearing device user, a feature extractor for determining at least one emotion-correlated feature from each of the speech signal and the output signal, a comparing unit for comparing the emotion-correlated features determined from the speech signal and the output signal to determine a comparison result, and a controller for carrying out a method according to the invention.

Advantageous embodiments and developments are the subject of the dependent claims (subclaims).

The advantages and embodiments set forth with respect to the method are applicable analogously to the hearing aid, and vice versa. Where method steps are described below, advantageous embodiments for the hearing device result in particular from being adapted to execute one or more of these method steps.

The method according to the invention is provided and configured to operate a hearing device. As such, the hearing device is configured to be worn on or in an ear of a hearing device user (hearing device wearer), wherein the method is carried out in particular when the hearing device is worn on or in an ear of the hearing device user. In particular, the hearing device is a hearing aid which is provided and configured to compensate, in particular signally compensate, hearing loss in the hearing device user.

As such, the hearing device has a receiving unit for receiving speech information and transforming into a speech signal. Furthermore, the hearing device has a signal processing unit for signally processing (signal processing of) the speech signal. As such, the signal processing unit transforms the speech signal into an output signal (output audio signal, processed signal), wherein the output signal is able to be output to a hearing device user by using an output unit.

Here and hereinafter, a "speech signal" is understood to mean, in particular, an acoustic or electrical signal which is able to transmit, save or process verbal or spoken (speech) information. In particular, such a speech signal contains information which are produced by the human voice and may include words, sentences, sounds or other vocal expressions. A speech signal may be present in various forms, including analog sound waves, digital audio data or other electrical signals which encode or transmit speech information.

As an example, the receiving unit has an acousto-electrical transducer which receives acoustic sound signals from an environment and transforms them into a digital input signal. As such, the transducer is preferably adapted as a microphone. Additionally or alternatively, the receiving unit may have a transceiver (RF receiver, T-coil . . . ) for receiving wireless radio signals and generating a corresponding input signal therefrom.

As such, the, in particular, digital or electrical speech signal is usually a part of the received input signal (input audio signal). For example, as such, the receiving unit has voice activity detection (VAD) to isolate or separate the speech signal from the remaining input signal. In this respect, voice activity detection is to be understood, in particular, as the detection (in terms of signals) of the presence or absence of human speech. In other words, the speech signal is preferably the (digital or electrical) signal output by voice activity detection.

As an example, the voice activity detection may be part of the receiving unit. Preferably, however, the voice activity detection is part of the signal processing unit, wherein the receiving unit generates an input signal from the speech information, which includes the speech signal and a residual signal, wherein the speech signal is only isolated or separated in the course of the signal processing.

In particular, the output of the output signal is an audio or sound signal which generates an electro-acoustic transducer (loudspeaker) as an output unit. Hence, the output unit transforms the electrical output signal into an acoustic audio or sound signal.

According to the method, speech information is received and transformed into a speech signal. As such, the speech signal originates from a speech utterance, for example, which is spoken by a speaker close to the hearing device user and sensed by the receiving unit of the hearing device. Alternatively, the utterance may also originate from a radio signal, for example a Bluetooth signal or a cellular signal, (e.g., media streaming or telephone calls) which is transmitted to the receiving unit via an external accessory device, such as a smartphone.

As such, the speech signal is transformed or processed by the signal processing unit into the output signal. In other words, the speech signal is modified or altered through signal processing by the signal processing unit. Here and hereinafter, "signal processing" is understood to mean transformation, manipulation or analysis of the speech signal by using digital or analog technologies, so that the speech or speech information (or their acoustic information) in the output signal is comprehensible to the hearing device user. The signal processing includes, among others, filtering, amplification, modulation and demodulation of the speech signal or the speech information contained therein.

According to the method, at least one emotion-correlated feature is then determined from each of the speech signal and the output signal. In other words, at least one emotion-correlated feature is determined from each of the original (non-processed) speech signal and the signally processed speech signal (output signal).

Here and hereinafter, an "emotion-correlated feature" is understood to mean, in particular, a measurable or sensible property or parameter which is related to an emotional state of the speaker, i.e., the source of the speech information, or is correlated to such a state. As an example, the emotion-correlated feature may be a voice pitch or voice frequency. As an example, the emotion-correlated feature is determined by a temporal, spectro-temporal analysis of the speech signal or output signal.

In particular, the emotion-correlated feature is a GeMAPS feature (GeMAPS: Geneva Minimalistic Acoustic Parameter Set) or parameter, as described in F. Eyben et al., "The Geneva Minimalistic Acoustic Parameter Set (GeMAPS) for Voice Research and Affective Computing," in IEEE Trans. Affective Computing, Vol. 7(2), July 2015.

As an example, the emotion-correlated feature is a pitch frequency, a jitter (i.e., a deviation from the pitch frequency), a frequency of the first formant, a frequency of the second formant, a frequency of the third formant, a bandwidth of the 1$^{st}$ formant (formant range, formant space), a difference in the peak amplitudes of successive pitch frequency periods, a loudness in the hearing spectrum, an overtone-to-noise ratio, an aggregate energy of between 50 Hz (hertz) to 1000 Hz, an aggregate energy of between 1 kHz (kilohertz) to 5 kHz, a ratio between the strongest peak power of between 0 KHz to 2 kHz and 2 kHz to 5 kHz, a spectral slope within 0 Hz to 500 Hz, a spectral slope in the range of 500 Hz to 1500 Hz, a relative energy between first, second and third formants, a power ratio between the peak of the spectral harmonic in the first, second and third formants and the power of the spectral peak at the pitch frequency, a power ratio between the pitch frequency and the second multiple of the pitch frequency, a power ratio between the pitch frequency and the highest overtone in the third formant range.

In particular, in each of the speech signal and the output signal, the parameter is determined as the emotion-correlated feature, so that the determined features of the speech signal and the output signal are comparable to one another. In a next method step, the emotion-correlated features determined from the speech signal and the output signal are compared to one another, and a comparison result is determined from the comparison. With the comparison to the non-processed speech signal, it is possible to evaluate, from the comparison result, to what extent the emotion-correlated features or information of the speech signal have been altered in the output signal by the signal processing.

According to the invention, the signal processing unit or the signal processing thereof is set as a function of the comparison result. According to the method of the invention, the sum of hearing device algorithms is controlled and/or regulated such that the acoustic features relevant for the emotion detection are not deteriorated (or are even improved), so that the hearing device user is able to detect emotions from the processed speech signal (i.e., in the outputted output signal). Therefore, the aim of the invention is to analyze the input or the speech signal with respect to its acoustic features relevant for emotion detection, and to control or limit the effect of each individual and all algorithms of the signal processing so as to ensure that the acoustic features for the emotion detection are maintained as completely as possible.

According to the method, the signal processing of the speech signal is thus performed with regard to improved speech perception, while also (numerically) maintaining the emotion-correlated features contained in the speech information. Thus, in contrast to previous types of signal processing, a focus is on the emotions of the conversation partner and the maintenance of their information.

In this respect, it is possible, for example, to determine a number of emotion-correlated features, i.e., multiple, at least two emotion-correlated features, from the signals. Which specific parameters or features are determined is initially irrelevant. In this respect, it is conceivable, for example, that different emotion-correlated features may be determined for different types of signal processing of the speech signal, and compared to one another. Which emotion-correlated features are influenced by which types of signal processing may be identified from past speech data or from corresponding experiments or tests, for example. For different hearing situations and ambient conditions or use scenarios, different relevant emotion-correlated features may apply (for example, conversational situations in a loud or quiet environment, conversational situations in movies . . . ).

Preferably, the set of parameters or features is always the same, irrespective of the speech utterance. As such, the emotions are characterized by various degrees of distinctiveness of the acoustic features. With a given speech signal and signal processing (e.g., denoising) enabled, another degree of distinctiveness of features will be expected than when signal processing is not enabled. Thus, by comparing the features, the alteration may be employed as an indicator to adapt the signal processing.

For example, with denoising (noise reduction) enabled, it may happen that a feature which extracts information from a certain frequency band has a lesser degree of distinctiveness than without denoising. In such a case, it may be expected that the denoising algorithm is set such that it is too "aggressive" in the frequency range considered. According to the invention, the denoising would be set towards "more defensive" in such a case. In particular, the denoising is set such that the denoising is (still) working in an acceptable manner and the emotion feature is still distinctive. Such a trade-off between maintenance of the emotion features and speech comprehensibility may depend on the situation, for example if the hearing device wearer stands on a train platform and wants to hear the loudspeaker announcements, emotions maintained in the hearing device signal are less important and the focus is mainly or exclusively on speech comprehensibility.

Thus, as an example, it is conceivable that an acoustic ambient situation is sensed and classified by using a corresponding classifier, wherein weighting between maintenance of the emotion features and speech comprehensibility is made based in the classified ambient situation.

Furthermore, it is conceivable for emotion features attenuated by the signal processing to be re-added to the output signal artificially.

In an advantageous embodiment, the comparison result is compared to at least one stored threshold, and the signal processing is set as a function of the threshold comparison. Thus, the speech signal is analyzed with regard to its acoustic features relevant for emotion detection, wherein thresholds or rules are specified on how the emotion-correlated features are allowed to be altered by the signal processing, i.e., the sum of the algorithms, so that the effect of each individual and all types of signal processing is controlled and limited. This ensures that the acoustic features and information in the output signal are maintained as far as possible.

For different emotion-correlated features, different thresholds are possible. Furthermore, different types of signal processing, for example different algorithms, may be associated with different thresholds, so that only those types of signal processing by the signal processing unit are set or altered for which the threshold comparison delivers a corresponding comparison result. In this way, a particularly effective and target (re-)adjustment or setting of the signal processing unit is able to be realized.

In one conceivable embodiment, a deviation (level of deviation) between the emotion-correlated features of the speech signal and the output signal is determined as the comparison result, for example. As an example, as the comparison result or the deviation, the square of a Euclidean distance may be used in the form of $$\gamma = \sum_{i=1}^{j} |F_i - F_i'|^2$$

wherein $\gamma$ is the comparison result or the deviation, F is the emotion-correlated feature of the speech signal, F' is the emotion-correlated feature of the output signal, i is a running index, and j is the number of used/relevant features. Thus, for a number of emotion-correlated features, the features form a feature vector, wherein the comparison result is the square of a Euclidean norm (squared Euclidean norm) between the feature vector of the speech signal and the output signal.

If GeMAPS parameters are used as emotion-correlated, for example, j equals eighteen (18), for example, if all of the eighteen GeMAPS parameters are used for assessing or evaluating the deviation. In other words, feature vectors with eighteen entries are created for the speech signal and the output signal.

Preferably, the signal processing is set such that the deviation is minimized. In other words, the or each emotion-correlated feature is largely adapted to the corresponding emotion-correlated feature of the speech signal. This ensures that the information on the speaker's emotions is not or only minimally distorted. In other words, an output signal is generated which substantially corresponds to the speech signal with regard to the emotion information contained.

The above formula represents a generic technique for calculating the deviation. Based on the respective application, the distance dimension may be altered; for example, it is conceivable to supplement the formula by introducing weighting factors so as to give a greater weight to some features than to others. This approach is particularly sensible if the aim of application is to maintain a certain emotion, e.g., anger. In this example, the features characterizing "anger" would be given greater weight, and thus, when minimizing the distance, there would be particular emphasis on these features and hence on maintaining this emotion.

In an additional or alternative embodiment, the signal processing would be set based on the comparison result such that the at least one emotion-correlated feature in the output signal is amplified. That is, in this embodiment, the method is used to not only maintain acoustic features for the emotion detection in the output signal but to improve them, i.e., amplify them with respect to the speech signal. In this way, emotion detection is improved for the hearing device user, which is advantageous in particular for hearing device users whose ability to detect emotions is impaired, e.g., due to hearing loss.

In order to ensure that emotion information is amplified and not artificially distorted, i.e., to ensure that the amplification merely emphasizes emotions which are also contained in the original speech information, whether the speech signal contains emotion information is checked in advance.

For example, the speech signal is examined using a probabilistic model which issues a probability value for each emotion as to whether the emotion is present in the speech signal or not. An amplification of an emotion or an emotion-correlated feature is performed in particular if the probability of an emotion is above a stored threshold. The magnitude of the threshold is initially irrelevant. It may be identified from past conversational data or from corresponding experiments or tests, for example. Such a probabilistic model is easy to derive. For example, with a suitable choice of the emotion classification algorithm, the distance of the sample considered from the decision limit may be employed as the probability.

For example, in the course of the comparison, the Euclidian norms of the feature vectors determined for the speech signal are compared to the output signal, and the signal processing by the signal processing unit is set if a condition of the form of $$\sqrt{F_1^2 + F_2^2 + \cdots + F_j^2} \geq \sqrt{F_1'^2 + F_2'^2 + \cdots + F_j'^2}$$

is met, wherein F is the emotion-correlated feature of the speech signal, F' is the emotion-correlated feature of the output signal, i is a running index and j is the number of used/relevant features. This means, in the course of the comparison, the lengths of the feature vectors are compared to one another, wherein the comparison result indicates which feature vector is the longest, i.e., which signal has the greatest information content with regard to emotion information. As such, the signal processing is set if the feature vector of the output signal is less or equal to the feature vector of the speech signal.

Principally, the issue here is that there is no reference (the clear speech signal) with such a "live" modification of the emotional contents of a speech utterance. For example, for a comparison according to the above formula, it is estimated whether the analyzed received signal carries an emotion, and starting from a certain certainty the emotion is artificially exposed. The latter may be accomplished by using emotion-typical prototype filters which may boost certain frequency ranges.

Here and hereinafter, "estimation" or "estimate" is understood to mean an approximate determination of the emotion information contained in the speech signal by analyzing the speech signal, for example by pre-characterized measurements, stored tables or characteristics, or by using statistical-mathematic techniques. For example, by using a (robust) classifier or feature extractor, it is estimated whether the speech signal contains an emotion or an emotion-correlated feature.

In a convenient development, the length of the output signal feature vector is scaled with a stored scaling factor $\alpha$ (wherein $\alpha > 1$), wherein the scaling factor is chosen so as to cause a desired amplification of the emotion-relevant features in the output signal.

In this respect, it is conceivable, for example, to switch between the threshold comparison described above and the amplification of the emotion-correlated features depending on the hearing situation. For example, in a quiet ambient situation with little background noise, the threshold comparison is performed to represent the emotion information of the speech information as undistorted as possible, while, in a loud ambient situation with lots of background noise, for example, the emotion-correlated features are amplified to be more easily perceivable for the hearing device user.

The hearing device according to the invention, is provided and configured to be worn in an ear of a hearing device user. Furthermore, the hearing device is preferably provided and configured to compensate hearing loss in the hearing device user. In other words, in the preferred use case, the hearing device is a hearing device adapted to aid hearing-impaired persons. The hearing device is in particular embodied as a hearing aid.

The hearing device according to the invention is suitable and configured for carrying out a method described above. The hearing device has a receiving unit for receiving speech information and transforming into a speech signal, a signal processing unit for transforming a speech signal into an output signal, an output unit for outputting an output signal to a hearing device user, a feature extractor for determining at least one emotion-correlated feature from each of the speech signal and the output signal, and a controller (i.e., a control unit) for carrying out the method described above.

The controller is signally coupled at least to the signal processing unit and to the feature extractor. As such, the signal processing unit and the feature extractor may be part of the controller. In other words, the functionalities of signal processing and feature extraction may be integrated into the controller in terms of programming or circuitry. As such, the controller is also directly signally coupled to the receiving unit and to the output unit.

Herein, the controller is generally set up—in terms of programming and/or circuitry—for performing the method according to the invention described above. Thus, the controller is specifically configured to process the speech signal to the output signal by receiving unit by using the signal processing, and to determine at least one emotion-correlated feature from each of the speech signal and the output signal by using the feature extractor. Furthermore, the controller is configured to compare the determined features to one another and set the signal processing based on a resulting comparison result.

In a preferred embodiment, at least substantially, the controller is formed by a microcontroller with a processor and a data storage in which the functionality for performing the method according to the invention is implemented by programming in the form of operating software (firmware) so that the method—if appropriate in interaction with a user—is performed automatically when executing the operating software in the microcontroller. Within the scope of the invention, the controller may alternatively also be formed by a non-programmable electronic component, such as an application-specific integrated circuit (ASIC) or by an FPGA (field-programmable gate array), in which the functionality for carrying out the method according to the invention is implemented by circuitry.

As such, the hearing device is adapted to receive sound signals from the environment and output them to the hearing device user. The hearing device has a (hearing) device housing, in which the receiving unit, the signal processing unit, the feature extractor, the controller, and the output unit are received, for example. The device housing is adapted such that it may be worn on the head and close to the ear, e.g., in the ear, on the ear or behind the ear.

The hearing device has at least one acousto-electrical input transducer, in particular a microphone, which is part of the receiving unit. When the hearing device is in operation, the input transducer receives sound signals (noise, tones, speech, etc.) from the environment, and transforms then into an electrical input signal (acoustic data, input audio signal). As such, the hearing device further has, as part of the receiving unit, voice detection or voice activity detection (VAD), for example as part of the signal processing unit, which generates a speech signal from the input signal or the acoustic data. Furthermore, the hearing device in particular has an electro-acoustic output transducer, for example in the form of a (miniature) loudspeaker, to generate an acoustic output signal from an audio signal (output signal) generated by the signal processing unit. As such, the output transducer may be part of the output unit.

Thus, the hearing device according to the invention allows controlling and/or regulating the sum of the hearing device algorithms such that the acoustic features relevant for the emotion detection are not deteriorated (or are even improved), so that the hearing device user is able to detect emotions from the processed speech signal (i.e., in the outputted output signal).

Other features which are considered as characteristic for the invention are set forth in the appended claims.

Although the invention is illustrated and described herein as embodied in a hearing device and a method of operating a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

The single FIGURE of the drawing is a block diagram showing a simplified and schematic representation for a hearing device.

DETAILED DESCRIPTION OF THE INVENTION

Referring now in detail to the single FIGURE of the drawing, there is seen, in particular, a hearing device 2 embodied as a hearing aid.

The hearing device 2 has a receiving unit 4 with at least one acousto-electrical input transducer 6, for example a microphone, and with a voice detection unit 8 (voice activity unit).

When the hearing device 2 is in operation, the input transducer 6 receives sound signals (noise, tones, speech, etc.) from the environment, and transforms then into an electrical input signal E. The voice detection unit 8 is embodied as part of a controller 10, for example, and, in operation, generates a speech signal S from the input signal E if speech information is contained in the sound signals received.

The speech signal S is processed into an output signal A by using a signal processing unit 12 of the controller 10. As such, the signal processing by the signal processing unit 12 is the sum of algorithms for the modification of the speech signal S into the output signal A, which is intended to improve speech comprehension for a hearing device user, for example by compensating hearing loss in the hearing device user through signal processing.

The non-processed speech signal S and the processed speech signal, i.e., the output signal A, are each supplied to a feature extractor 14, which may also be integrated into the controller 10, for example. From each of the speech signal A and the output signal A, the feature extractor 14 determines a feature vector with a number of emotion-correlated features as vector entries. For example, feature vectors with eighteen (18) vector entries or emotion-correlated features are determined, wherein the features of the speech signal S are designated as $F_1, \ldots, F_{18}$, and the features of the output signal A are designated as $F_1', \ldots, F_{18}'$.

The determined features $F_1$ to $F_{18}$ and $F_1'$ to $F_{18}'$ are supplied to a comparing unit 16 of the controller 10. The comparing unit 16 performs a feature comparison of the features $F_1$ to $F_{18}$ and $F_1'$ to $F_{18}'$ and generates a comparison result $\gamma$.

Depending on the comparison result $\gamma$, either a control and/or regulating signal R is generated, through the use of which the signal processing by signal processing unit 12, in particular the algorithms thereof, is set, or the output signal A is forwarded to an output unit 18. As an example, the output unit 18 is embodied as an electro-acoustic output transducer, for example in the form of a miniature loudspeaker, and transforms the output signal A into an acoustic sound signal for the hearing device user.

In one possible embodiment, a square of a Euclidean distance is determined as the feature comparison. The comparison result $\gamma$ or the deviation between the feature vectors is thus $$\gamma = \sum_{i=1}^{18} |F_i - F_i'|^2$$

As such, the comparison result $\gamma$ is compared to a stored threshold, wherein the control and/or regulating signal R is generated if the comparison result $\gamma$ is higher than the threshold, i.e., if the deviation or distance between the feature vectors is greater than the threshold, and wherein the output signal A is output by output unit 18 if the comparison result $\gamma$ is less than the threshold, i.e., if the deviation or distance between the feature vectors is less than the threshold.

Preferably, the threshold is determined based on an audiological optimization. In particular, the threshold is dimensioned such that, when falling below the threshold, an emotional content in the output signal A is not substantially altered compared to the non-processed speech signal S.

As such, through the use of the control and/or regulating signal R, the amplifications during signal processing are adapted, for example, wherein the adaptation strategy substantially depends on the algorithm used for signal processing. The way in which they have to be altered specifically to reduce the comparison result correspondingly, may be determined by corresponding experiments, for example. The control and/or regulating mechanisms described are used in particular with sound optimization of the hearing devices.

The claimed invention is not limited to the embodiments described above. Rather, other variants of the invention may also be derived therefrom by a person skilled in the art within the scope of the disclosed claims without departing from the subject of the claimed invention. In particular, all the individual features described in connection with the various exemplary embodiments are also combinable in any other way within the scope of the disclosed claims without departing from the subject of the claimed invention.

In one embodiment not shown, it is conceivable for example for the signal processing by the signal processing unit 12 to be set based on the comparison results $\gamma$ such that the at least one emotion-correlated feature $F_1'$ to $F_{18}'$ in the output signal A is amplified.

The following is a summary list of reference numerals and the corresponding structure used in the above description of the invention:

2 Hearing device
4 Receiving unit
6 Input transducer
8 Voice detection unit
10 Controller
12 Signal processing unit
14 Feature extractor
16 Comparing unit
18 Output unit
E Input signal
S Speech signal
A Output signal
F1, . . . , F18 Features
F1', . . . , F18' Features
R Control and/or regulating signal

The invention claimed is:

1. A method of operating a hearing device, the method comprising:

receiving speech information from a user and transforming the speech information into a speech signal;

processing the speech signal, by a signal processing unit, and generating an output signal;

determining at least two respective Geneva Minimalistic Acoustic Parameter Set (GeMAPS) parameters from each of the speech signal and the output signal;

extracting feature vectors of the speech signal and the output signal, each feature vector including the at least two respective GeMAPS parameters as vector entries;

determining a length of the feature vector of the speech signal and a length of the feature vector of the output signal;

comparing the length of the feature vector of the speech signal to the length of the feature vector of the output signal; and changing parameters of the signal processing unit using a control signal generated as a function of the comparison result if the length of the feature vector of the output signal is less than or equal to the length of the feature vector of the speech signal.

2. The method according to claim 1, which further comprises comparing the comparison result to a stored threshold, and setting parameters of the signal processing unit as a function of the comparison of the comparison result to the stored threshold.

3. The method according to claim 1, which further comprises:

determining a deviation between the GeMAPS parameters of the speech signal and the the GeMAPS parameters of the output signal as the comparison result; and setting parameters of the signal processing unit to minimize the deviation.

4. The method according to claim 1, which further comprises setting parameters of the signal processing unit to amplify at least one of the at least two respective GeMAPS parameters in the output signal.

5. The method according to claim 1, which further comprises using a square of a Euclidean norm as the comparison result.

6. A hearing device, comprising:

a receiving unit for receiving speech information and transforming the speech information into a speech signal;

a signal processing unit for processing the speech signal and generating an output signal;

a feature extractor for extracting feature vectors from each of the speech signal and the output signal, each feature vector including as vector entries at least two GeMAPS parameters determined from the respective speech signal or output signal;

a comparing unit for comparing a length of the feature vector of the speech signal and a length of the feature vector of the output signal to determine a comparison result;

an output unit for outputting an output signal to the hearing device; and a controller configured to carry out the method according to claim 1.

7. A method of operating a hearing device, the method comprising:

receiving speech information from a user and transforming the speech information into a speech signal;

processing the speech signal, by a signal processing unit, and generating an output signal;

determining at least two respective Geneva Minimalistic Acoustic Parameter Set (GeMAPS) parameters from each of the speech signal and the output signal;

extracting feature vectors of the speech signal and the output signal, each feature vector including the at least two respective GeMAPS parameters as vector entries;

determining a deviation between the feature vector of the speech signal and the feature vector of the output signal;

comparing the deviation to a stored threshold value; and changing parameters of the signal processing unit using a control signal generated as a function of the comparison result if the deviation exceeds the stored threshold value.

8. A hearing device, comprising:

a receiving unit for receiving speech information and transforming the speech information into a speech signal;

a signal processing unit for signal-processing the speech signal and generating an output signal;

a feature extractor for extracting feature vectors from each of the speech signal and the output signal, each feature vector including as vector entries at least two GeMAPS parameters determined from the respective speech signal or output signal;

a comparing unit for comparing the feature vectors extracted from the speech signal and the output signal to determine a deviation between the feature vector of the speech signal and the feature vector of the output signal;

an output unit for outputting an output signal to the hearing device; and a controller configured to carry out the method according to claim 7.

* * * * *